United States Patent
Klemm et al.

(10) Patent No.: US 9,678,668 B2
(45) Date of Patent: Jun. 13, 2017

(54) SYSTEM AND METHOD FOR UNBALANCED RAID MANAGEMENT

(71) Applicant: Dell International L.L.C., Round Rock, TX (US)

(72) Inventors: Michael J. Klemm, Minnetonka, MN (US); Michael H. Pittelko, Chaska, MN (US)

(73) Assignee: Dell International L.L.C., Round Rock, TX (US)

( * ) Notice: Subject to any disclaimer, the term of this patent is extended or adjusted under 35 U.S.C. 154(b) by 34 days.

(21) Appl. No.: 15/248,485

(22) Filed: Aug. 26, 2016

(65) Prior Publication Data

US 2016/0364149 A1    Dec. 15, 2016

Related U.S. Application Data

(63) Continuation of application No. 14/628,955, filed on Feb. 23, 2015, now Pat. No. 9,454,311, which is a continuation of application No. 13/310,316, filed on Dec. 2, 2011, now Pat. No. 9,015,411.

(51) Int. Cl.
*G06F 3/06* (2006.01)
*G06F 11/10* (2006.01)

(52) U.S. Cl.
CPC ............ *G06F 3/0604* (2013.01); *G06F 3/061* (2013.01); *G06F 3/0611* (2013.01); *G06F 3/0613* (2013.01); *G06F 3/0631* (2013.01); *G06F 3/0644* (2013.01); *G06F 3/0683* (2013.01); *G06F 3/0685* (2013.01); *G06F 3/0689* (2013.01); *G06F 11/1076* (2013.01); *G06F 2206/1012* (2013.01)

(58) Field of Classification Search
CPC ........... G06F 3/0689; G06F 2206/1012; G06F 12/023; G06F 2212/262; G05F 11/1076; G05F 11/1092
See application file for complete search history.

(56) References Cited

U.S. PATENT DOCUMENTS

| | | | |
|---|---|---|---|
| 6,718,434 B2 | 4/2004 | Veitch et al. | |
| 7,346,831 B1 * | 3/2008 | Corbett | G06F 11/1076 714/5.11 |

(Continued)

OTHER PUBLICATIONS

International Search Report and Written Opinion for related PCT Application No. PCT/US2012/067201, mailed Feb. 5, 2013 (7 pages).

(Continued)

*Primary Examiner* — David X Yi
*Assistant Examiner* — Ramon A Mercado
(74) *Attorney, Agent, or Firm* — Winthrop & Weinstine, P.A.

(57) ABSTRACT

A method for dynamically balancing the allocation of data among a plurality of physical data storage devices having a plurality of RAID devices defined thereon, wherein at least one of the plurality of RAID devices is comprised of at least one of a different type of physical storage device or a different number of physical data storage devices than at least one other of the plurality of RAID devices, includes determining a usage factor unique to each RAID device and balancing data I/O based at least in part on the usage factor.

20 Claims, 10 Drawing Sheets

(56) References Cited

U.S. PATENT DOCUMENTS

| | | | |
|---|---|---|---|
| 7,398,418 B2* | 7/2008 | Soran | G06F 3/0608 |
| | | | 711/114 |
| 7,822,847 B2 | 10/2010 | Kusama et al. | |
| 7,886,111 B2* | 2/2011 | Klemm | G06F 3/0608 |
| | | | 702/182 |
| 7,949,847 B2 | 5/2011 | Murase | |
| 7,984,259 B1* | 7/2011 | English | G06F 3/061 |
| | | | 711/114 |
| 2002/0103969 A1 | 8/2002 | Koizumi et al. | |
| 2002/0156972 A1 | 10/2002 | McKnight et al. | |
| 2003/0041211 A1* | 2/2003 | Merkey | G06F 11/1076 |
| | | | 711/114 |
| 2004/0133707 A1 | 7/2004 | Yoshiya et al. | |
| 2005/0066127 A1* | 3/2005 | Korgaonkar | G06F 3/0601 |
| | | | 711/114 |
| 2005/0114593 A1 | 5/2005 | Cassell et al. | |
| 2008/0092143 A1 | 4/2008 | Koseki et al. | |
| 2008/0183964 A1 | 7/2008 | Inoue et al. | |
| 2008/0201392 A1 | 8/2008 | Nakajima et al. | |
| 2009/0204758 A1 | 8/2009 | Luning | |
| 2010/0153641 A1 | 6/2010 | Jagadish et al. | |
| 2010/0250846 A1* | 9/2010 | Hobbet | G06F 3/061 |
| | | | 711/114 |
| 2011/0167219 A1* | 7/2011 | Klemm | G06F 3/0608 |
| | | | 711/114 |
| 2011/0179225 A1 | 7/2011 | Flynn et al. | |
| 2012/0137065 A1* | 5/2012 | Odenwald | G06F 3/0605 |
| | | | 711/114 |
| 2012/0278527 A1 | 11/2012 | Cho et al. | |

OTHER PUBLICATIONS

Extended European Search Report for related European Application No. 12852809.8, mailed Jun. 9, 2015 (8 pages).

* cited by examiner

901 — CLEAR DISK USAGE

STEP 1: 902
CALCULATE THE PER DISK USAGE FOR EACH RAID

| RAID | USAGE | EXTENTS /DISKS | RAIDUSAGE PERDISK |
|---|---|---|---|
| RG-A | 40 | 3 | 13 |
| RG-B | 42 | 4 | 10 |
| RG-C | 66 | 6 | 11 |
| RG-D | 78 | 7 | 11 |
| RG-E | 99 | 8 | 12 |
| RG-F | 24 | 3 | 8 |
| RG-G | 36 | 4 | 9 |

STEP 2: 903
TOTAL THE OVERLAPPING DISK USAGE FOR ALL OF THE DISKS

| RAID | DA-1 | DA-2 | DA-3 | DA-4 | DA-5 | DA-6 | DA-7 | DA-8 | DA-9 | DA-10 |
|---|---|---|---|---|---|---|---|---|---|---|
| RG-A | 13 | 13 | 13 | 0 | 0 | 0 | 0 | 0 | 0 | 0 |
| RG-B | 10 | 10 | 10 | 10 | 0 | 0 | 0 | 0 | 0 | 0 |
| RG-C | 0 | 0 | 0 | 0 | 11 | 11 | 11 | 11 | 11 | 11 |
| RG-D | 11 | 11 | 11 | 11 | 11 | 11 | 11 | 0 | 0 | 0 |
| RG-E | 12 | 12 | 12 | 12 | 12 | 0 | 0 | 12 | 12 | 12 |
| RG-F | 0 | 0 | 0 | 0 | 0 | 0 | 8 | 8 | 8 | 0 |
| RG-G | 0 | 0 | 0 | 0 | 9 | 9 | 9 | 9 | 0 | 0 |
| DISK TOTAL | 46 | 46 | 46 | 33 | 43 | 31 | 39 | 40 | 31 | 23 |

| RAID | DA-1 | DA-2 | DA-3 | DA-4 | DA-5 | DA-6 | DA-7 | DA-8 | DA-9 | DA-10 |
|---|---|---|---|---|---|---|---|---|---|---|
| RG-A | 46 | 46 | 46 | 0 | 0 | 0 | 0 | 0 | 0 | 0 |
| RG-B | 46 | 46 | 46 | 33 | 0 | 0 | 0 | 0 | 0 | 0 |
| RG-C | 0 | 0 | 0 | 0 | 43 | 31 | 39 | 40 | 31 | 23 |
| RG-D | 46 | 46 | 46 | 33 | 43 | 31 | 39 | 0 | 0 | 0 |
| RG-E | 46 | 46 | 46 | 33 | 43 | 0 | 0 | 40 | 31 | 23 |
| RG-F | 0 | 0 | 0 | 0 | 0 | 0 | 39 | 40 | 31 | 0 |
| RG-G | 0 | 0 | 0 | 0 | 43 | 31 | 39 | 40 | 0 | 0 |

STEP 3: 904
TOTAL THE DISK USAGE FOR EACH RAID DEVICE AND DIVIDE BY THE EXTENT COUNT TO GET THE USAGE FACTOR

| RAID | TOTAL USAGE | USAGE FACTOR |
|---|---|---|
| RG-A | 138 | 46 |
| RG-B | 171 | 42 |
| RG-C | 207 | 34 |
| RG-D | 284 | 40 |
| RG-E | 308 | 38 |
| RG-F | 110 | 36 |
| RG-G | 153 | 38 |

STEP 4:
SORT THE RAID DEVICES BASED ON THE USAGE FACTOR. LOWEST USAGE FACTOR IS BEST.

| DISK DA-1 | DISK DA-2 | DISK DA-3 | DISK DA-4 | DISK DA-5 | DISK DA-6 | DISK DA-7 | DISK DA-8 | DISK DA-9 | DISK DA-10 |
|---|---|---|---|---|---|---|---|---|---|
| RAID RG-A:USAGE 40 | | | | RAID RG-C:USAGE 66 | | | | | |
| RAID RG-B:USAGE 42 | | | | RAID RG-G:USAGE 36 | | | | | |
| RAID RG-D:USAGE 78 | | | | | | | | | |
| RAID RG-E: USAGE 99 | | | | | | | RAID RG-E | | |
| | | | | | RAID RG-F:USAGE 24 | | | | |
| DA-1 USAGE 46 | DA-2 USAGE 46 | DA-3 USAGE 46 | DA-4 USAGE 33 | DA-5 USAGE 43 | DA-6 USAGE 31 | DA-7 USAGE 37 | DA-8 USAGE 38 | DA-9 USAGE 29 | DA-10 USAGE 23 |

Fig. 10b

SYSTEM AND METHOD FOR UNBALANCED RAID MANAGEMENT

This application is a continuation of U.S. patent application Ser. No. 14/628,955, filed Feb. 23, 2015, which is a continuation of U.S. patent application Ser. No. 13/310,316, filed Dec. 2, 2011, now U.S. Pat. No. 9,015,411, the disclosure of each of which is hereby incorporated by reference herein in its entirety.

TECHNICAL FIELD

The present disclosure generally relates to data storage systems. More particularly, the present disclosure relates to systems and methods for the allocation of data in unbalanced disk/RAID configurations.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In this regard, RAID, an acronym for Redundant Array of Independent Disks, is a technology that provides increased storage functions and increased reliability through redundancy, and as such may be beneficially employed in information handling systems. Redundancy in a RAID device may be achieved by combining multiple disk drive components, which may include one or more disks of different type, size, or classification, into a logical unit, where data is distributed across the drives in one of several ways called "RAID levels." The data distribution determines the RAID type, e.g., RAID 0, RAID 5, RAID 10, etc RAID includes data storage schemes that can divide and replicate data among multiple physical disk drives. The physical disks are said to be in a RAID array, which is addressed by the operating system as one single disk. Many different schemes or architectures of RAID devices are known to those having ordinary skill in the art. Each different architecture or scheme may provide a different balance among various goals to be achieved in storing data, which include, but are not limited to, increased data reliability and increased input/output (hereinafter "I/O") performance. Furthermore, RAID devices may be grouped into one or more "tiers," where data of higher importance may be stored in higher performance RAID tiers, and data of lower importance may be stored in lower performance RAID tiers.

It is also known in the art to create a "page pool" of storage derived from one or more virtual volumes of storage, wherein the virtual volumes comprise one or more RAID devices of the same or different type. U.S. Pat. No. 7,398,418, the contents of which are hereby incorporated by reference in their entirety, discloses an example data storage system that employs a page pool of virtual volumes and dynamically allocates data space based on the page pool. As shown by way of example in FIG. 1, a disk storage system 110 may include a page pool of storage 112, i.e., a pool of data storage including a list of data storage space that is free to store data. The page pool 112 may maintain a free list of storage space from a plurality of RAID devices 114 and may manage read/write assignments based on a user's requests. User requested data storage volumes 116 may be sent to the page pool 112 to get storage space. Each volume can request storage space from the same or different classes of storage devices with same or different RAID levels, e.g. RAID 10, RAID 5, RAID 0, etc.

As further illustrated in FIG. 2, a matrix of virtual volumes or blocks 204 may be provided and associated with physical disks. The matrix of virtual volumes or blocks 204 may be monitored/controlled dynamically by one or more disk storage system controllers 202. The size of each virtual volume 204 can be predefined, and the location of data for each virtual volume 204 may be default as null. Each of the virtual volumes 204 may be null until data is allocated. The data can be allocated in any grid of the matrix or "pool" (e.g., a "dot" in the grid once data is allocated in the grid). Once the data is deleted, the virtual volume 204 may again be available and indicated to be "null". Thus, extra and sometimes expensive data storage devices, e.g. RAID devices, can be acquired later in time on a need basis, or removed once no longer needed. In this manner, a page pool of virtual volumes mapped to one or more RAID devices may provide a highly flexible and efficient data storage system.

Accordingly, such a RAID-based data storage system may be capable of employing RAID techniques across any number of virtual volumes disks. The remaining storage space is freely available. Through monitoring storage space and determining occupancy rate of the storage space of the RAID subsystem, a user does not have to acquire a large sum of drives that are expensive but have no use at the time of purchase. Thus, adding drives when they are actually needed to satisfy the increasing demand of the storage space significantly reduces the overall cost of the disk drives, and removing them when no longer needed frees up valuable storage space. The efficiency of the use of the drives may also be substantially improved.

Data allocation in existing RAID architectures, such as that disclosed in U.S. Pat. No. 7,398,418, may be determined by a scoring system that assigns one or more scores to each RAID device in the data storage system, and data is allocated to a particular RAID device based on the priority of the data (e.g., how often it is accessed) and/or by the scores assigned to the RAID devices. For example, in one example architecture, higher priority data is assigned to higher scoring RAID devices, and lower priority data is assigned to lower scoring RAID devices. Further examples of scoring and data allocation are disclosed in U.S. Pat. No. 7,398,418.

In balanced RAID configurations, where each RAID device is "wide-striped" across all disks in the data storage system, the disk being of the same size and type, existing data allocation and storage methods provide an accurate and efficient means for storing data in the most appropriate RAID device for such data. However, it is often the case that a data storage system includes disks that are not all of the same type or the same size, and thus it is not possible to wide-stripe each RAID device across all disks in the system, resulting in an "unbalanced" RAID configuration. Unbalanced RAID configurations may also result from the addition or removal of disks from a data storage system, where RAID devices are not re-striped after such addition or removal. Due to this unbalanced configuration, existing data allocation and storage methods may not be able to determine an accurate relative score for each RAID device, or allocate data in the most efficient manner to a particular RAID device. Lacking in the art are systems and methods that account for the unbalanced nature of a RAID-based data storage system in assigning scores to the respective RAID devices thereof and in allocating data for storage thereto.

BRIEF SUMMARY OF THE DISCLOSURE

In one embodiment, disclosed herein is an information handling system which may include a plurality of RAID devices defined on a plurality of physical data storage devices, wherein at least one of the plurality of RAID devices is comprised of at least one of a different type of physical storage device or a different number of physical data storage devices than at least one other of the plurality of RAID devices; and a processing unit, wherein the processing unit is configured to dynamically allocate data to the plurality of RAID devices so as to balance data I/O across the plurality of RAID devices.

In variations of this embodiment, balancing data I/O may include determining a usage factor for each RAID device. The usage factors may be used to sort the plurality of RAID devices on a page pool class free list. A usage factor may be based at least in part on a per RAID device disk usage, which comprises dividing a usage of the RAID device by a number of disks over which the RAID device is striped. The usage factor may be further based at least in part on an overlapping disk usage, which comprises a sum of the per RAID device disk usage of each RAID device that is striped across a physical disk. The usage factor may include a sum of the overlapping disk usages of each physical disk that the RAID device is striped across. The processing unit may be further configured to sort the plurality of RAID devices based on the respective usage factors. The processing unit may be further configured to balance data I/O where a RAID device crosses a data storage boundary. The processing unit may be further configured to balance data I/O where a physical disk is added to or removed from the information handling system.

In another embodiment, disclosed herein is a method for dynamically balancing the allocation of data among a plurality of physical data storage devices having a plurality of RAID devices defined thereon, wherein at least one of the plurality of RAID devices is comprised of at least one of a different type of physical storage device or a different number of physical data storage devices than at least one other of the plurality of RAID devices, which may include determining a usage factor unique to each RAID device; and balancing data I/O based at least in part on the usage factor.

In variations of this embodiment, the usage factor may be used to sort the plurality of RAID devices on a page pool class free list. The method may further include removing a RAID device based on the usage factor. A RAID device with the lowest usage factor may be removed. Balancing may occurs where a RAID device crosses a data storage boundary.

In yet another embodiment, disclosed herein is a method for allocating space from a RAID device in a storage system comprising a plurality of RAID devices comprised of a plurality of physical disks, which may include calculating an amount of space used on each of the plurality of disks by the RAID device; calculating a total amount of space used by the RAID device by summing the amount of space used by the RAID device on each of the plurality of disks; calculating a usage factor for the RAID device based on the calculated total amount of space and a relative performance score of each of the plurality of disks; sorting the RAID device among the plurality of RAID devices based on the calculated usage factor; and allocating space from a RAID device from one of the plurality of RAID devices based on the sort.

In variations of this embodiment, at least one of the plurality of disks may be of a different type than at least one other of the plurality of disks. At least one of the plurality of disks may be of a different size than at least on other of the plurality of disks. The method may further include adding a disk to the plurality of disks; defining a new RAID device that comprises the added disk; sorting the plurality RAID devices and the new RAID device based on a usage factor unique to each such RAID device; and allocating space from a RAID device based on the sort. The new RAID device may include both the added disk and at least one of the plurality of disks. The new RAID device may be grouped into a separate group from the plurality of RAID devices.

While multiple embodiments are disclosed, still other embodiments in accordance with the present disclosure will become apparent to those skilled in the art from the following detailed description, which shows and describes illustrative embodiments. As will be realized, the disclosed embodiments are capable of modifications in various aspects, all without departing from the spirit and scope of thereof. Accordingly, the drawings and detailed description are to be regarded as illustrative in nature and not restrictive.

BRIEF DESCRIPTION OF THE FIGURES

While the specification concludes with claims particularly pointing out and distinctly claiming the subject matter that is regarded as forming the various embodiments of the present disclosure, it is believed that the embodiments will be better understood from the accompanying Figures, in which:

FIGS. 10a-b illustrate an example balancing calculation (10a) based on an example RAID configuration (10b) in accordance with one embodiment of the present disclosure;

DETAILED DESCRIPTION

The present disclosure describes embodiments of systems and methods wherein a page pool of data storage may employ unbalanced RAID management (hereinafter "URM") to maximize the performance of a data storage system that either does not or cannot employ wide-striped RAID devices due to, for example, the use of data storage disks of different sizes, of different types, or the addition or removal of disks without re-striping the RAID devices, among other things. While the present disclosure describes examples using RAID disks, it will be appreciated that the present disclosure may be used in connection with any form of disk management. As used herein, the "performance" of a data storage system may refer to any of the read/write speed, storage capacity, or the level of redundancy, among other parameters. The present disclosure URM techniques and methods may periodically or substantially continuously evaluate the allocation loading of the disks within an unbalanced RAID data storage system and may determine and control to which physical disks the page pool makes subsequent page allocations in order to maintain an efficient system configuration.

Overview of RAID Configurations where Existing Data Allocation Methods May not be Optimal In existing architectures, which employ balanced RAID configurations, data allocation and management techniques often employ wide-striping of RAID devices to balance the load on the disks. As previously discussed, wide-striping places a RAID on as many disks as are available thereto. Advantages of wide-striped configurations include that it is relatively straight-forward to create an even load across multiple disks. That is, if all of the disks are a part of the RAID device, then an allocation of pages will use all of the disks.

Figure 1:
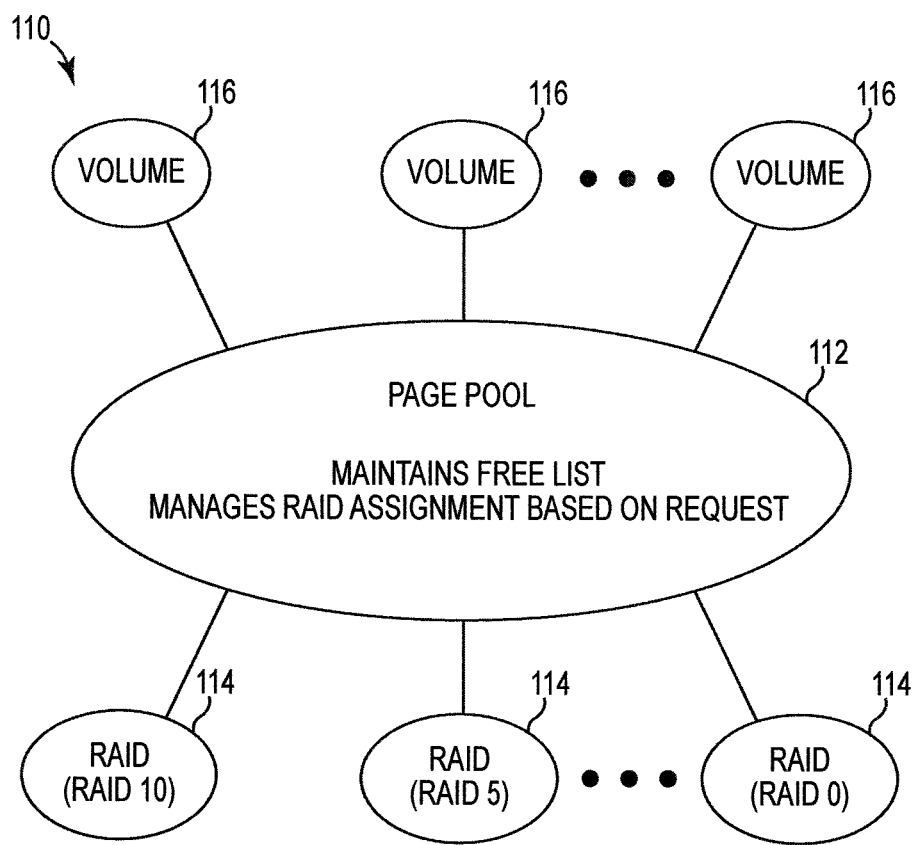
FIG. 1 illustrates a prior art example data storage system with a page pool architecture.
Figure 2:
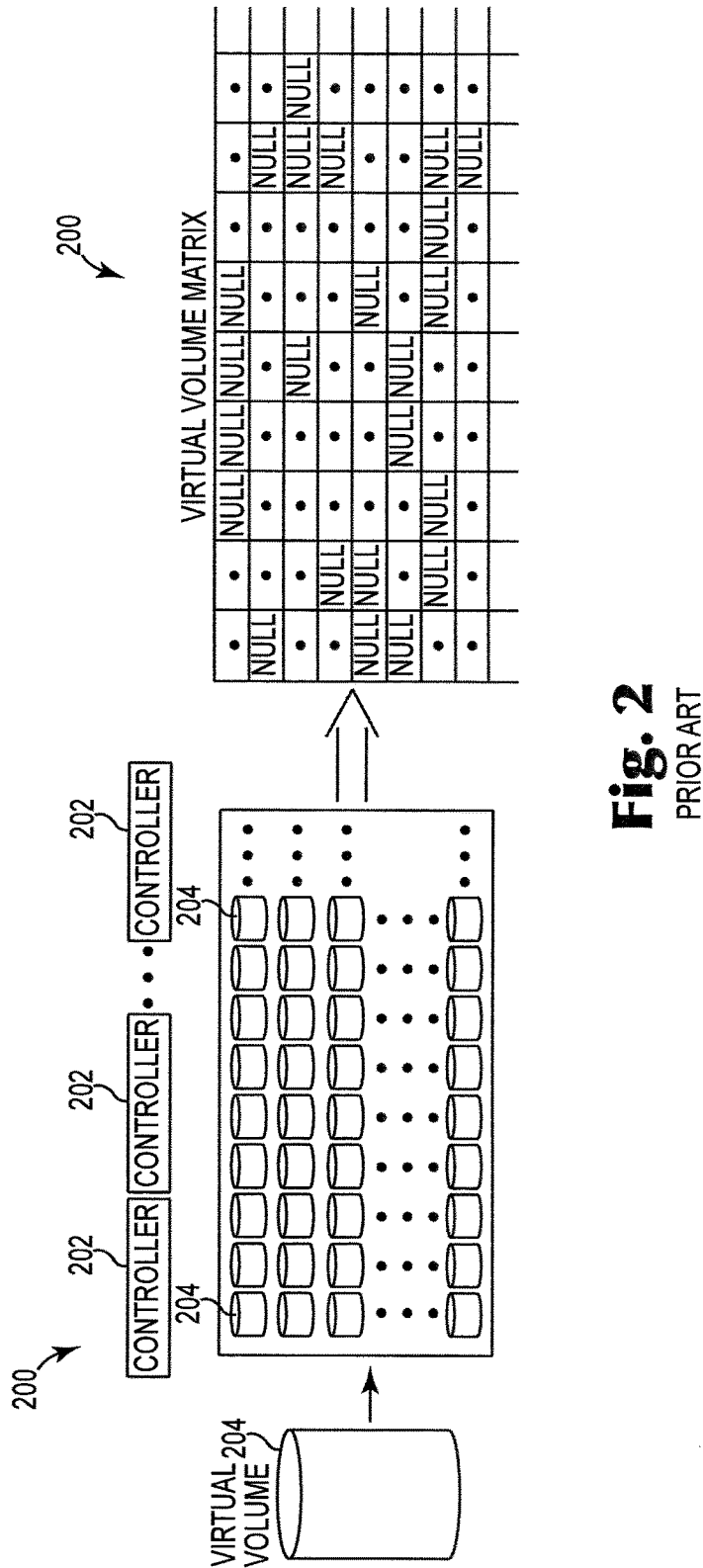
FIG. 2 illustrates a prior art example matrix of virtual volumes in accordance with a page pool architecture.
Figure 3:
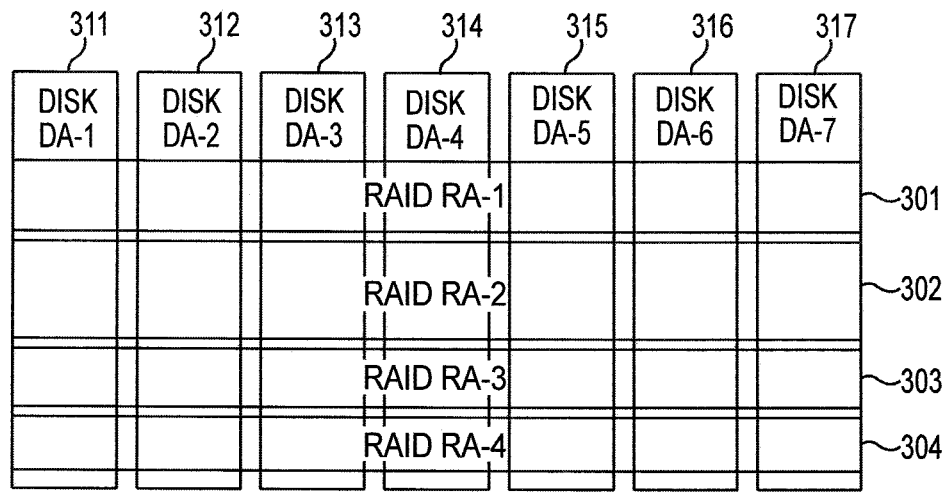
FIG. 3 illustrates an example balanced RAID configuration with wide-striping.

FIG. 3 shows an example data storage system architecture 300 that employs wide-striping. As can be seen, each RAID device RA-1, RA-2, RA-3, and RA-4 (reference numerals 301-304, respectively) are striped across (i.e., are comprised of at least a part of) each physical disk DA-1, DA-2, DA-3, DA-4, DA-5, DA-6, and DA-7 (reference numerals 311-317, respectively). Each disk 311-317 is of the same size and type. This particular data storage system configuration is known in the art as "balanced RAID," where each RAID device is comprised of part of each physical disk associated with the storage system. Balanced RAID configurations beneficially reduce the number of RAID devices in the system by ensuring that each physical disk comprises at least a part of the RAID device.

Figure 4:
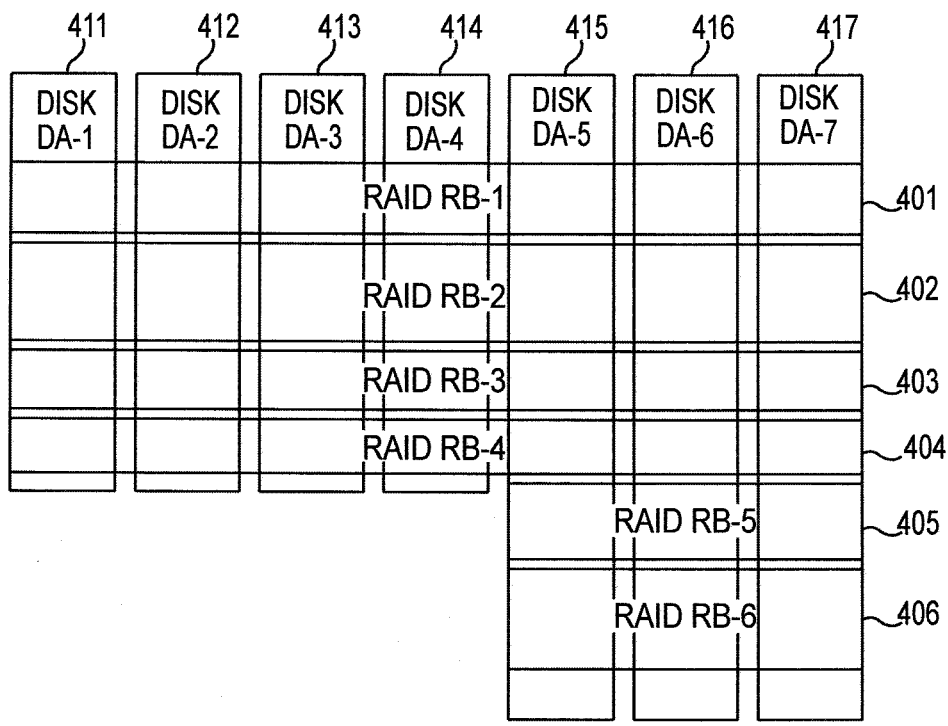
FIG. 4 illustrates an example unbalanced RAID configuration with different sized disks.

Perfectly balanced RAID configurations, however, are not possible in all data storage systems. By way of example, FIG. 4 depicts a RAID configuration where three of the disks (i.e., DB-5, DB-6, and DB-7, reference numerals 415-417, respectively) are larger than the other four disks shown (i.e., DB-1, DB-2, DB-3, and DB-4, reference numerals 411-414, respectively). In this configuration, existing data allocation and scoring systems may not provide the most efficient result. In one example, existing RAID scoring methods may give the highest score to the RAID devices striped across the most disks and/or that have the largest size. Using this method, therefore, the system may order the devices in the following order: RB-1 through RB-4, all of which are striped across all disks; followed by RB-5 through RB-6, striped only across disks DB-5 through DB-7 (see reference numerals 401 through 406, respectively). Using existing data allocation methods, only once the pages are substantially exhausted from the RAIDs that use all of the disks (RB-1, RB-2, RB-3, and RB-4) does the free list allocate the pages on the RAIDs that use a limited number of disks, due to their lower score. Thus, this configuration may yield a data storage system that has an inefficient allocation of data (i.e., a lack of appropriate balance of data among all available RAID devices), and possibly result in degraded system performance, because the scoring system does not appropriately account for the fact that RAID devices RB-5 and RB-6 are only striped across disks DB-5 through DB-7 in its scoring algorithm.

Figure 5:
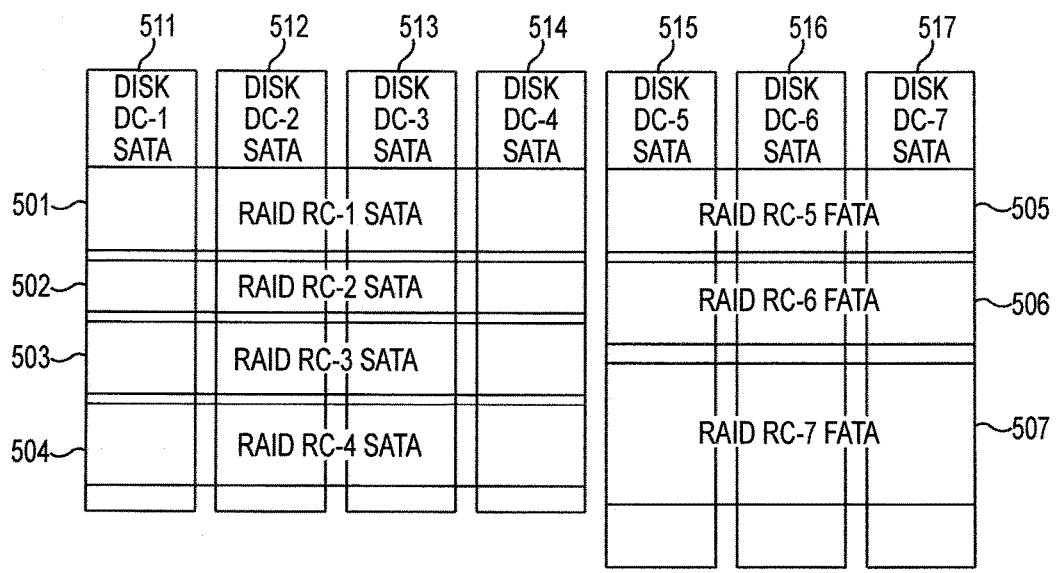
FIGS. 5 and 6 illustrate example unbalanced RAID configurations with different groupings.

In another example, FIG. 5 depicts a RAID configuration where three of the disks (i.e., DC-5, DC-6, and DC-7, reference numerals 415-417, respectively) are of a different type than the other fours disks shown (i.e., DC-1, DC-2, DC-3, and DC-4, reference numerals 401-404, respectively). The balanced RAID organizational architecture of the free list has problems when multiple disk types exist within the same RAID tier; that is, RAID does not allow for the creation of RAIDs that use multiple disk classes. Thus, as shown in FIG. 5, RAID devices cannot be striped across all disks, but rather RAID devices RC-1, RC-2, RC-3, and RC-4 (reference numerals 501-504, respectively) are relegated to the SATA disks whereas RC-5, RC-6, and RC-7 (reference numerals 505-507, respectively) are relegated to the FATA disks. Here, no single RAID device spans all of the disks within a tier, and thus existing data allocation methods may not yield the most efficient result. Rather, in some existing systems, when the two types of disks are not balanced, the scoring system again may use the disk class striped across the greatest number of disks first since the RAID devices on those disks likely score higher. After the higher scoring space is substantially exhausted, the page pool will allocate space from the lower scoring devices, and therefore the second set of disks. This results in a possible inefficient balancing between the two disks, and may not be optimal for system performance.

Figure 6:
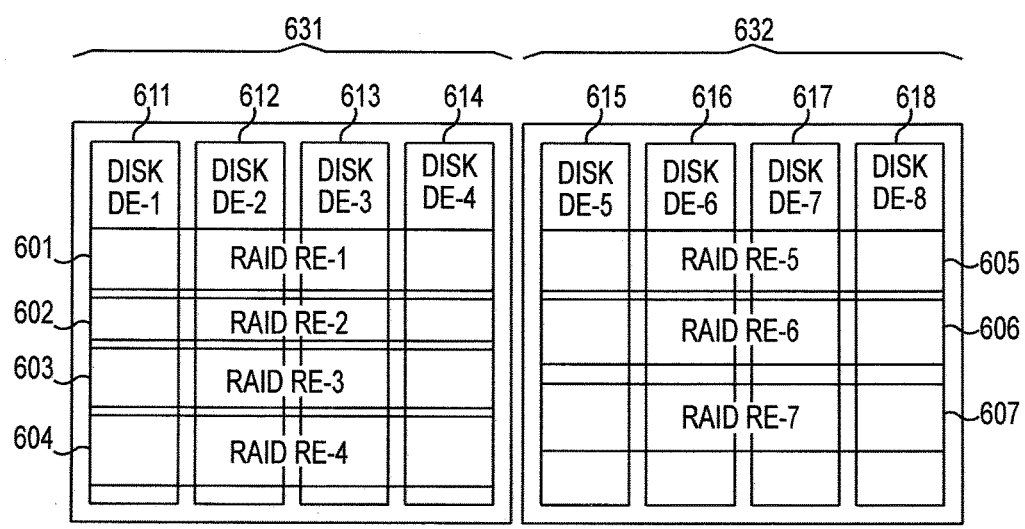

In yet a further example, RAID "groups" or subsets divide and apportion similar disks in order to, for example, manage fault domains. Where grouping is employed, the groups may be configured by the user depending on the protection desired. Grouping may thus limit the ability of the system to create wide-stripes across all disks, and therefore affects the free list management. A particular example of user initiated grouping is RAID Enclosure Level Fault Tolerance (ELFT) methods, that in some examples may only use a single disk from an enclosure within a stripe. Different stripes may use different disks within an enclosure. As shown in FIG. 6, an example grouped RAID configuration is depicted (e.g., based on a user selected ELFT). Disks DE-1 through DE-8 are provided (reference numerals 611-618, respectively), with RAID devices RE-1 through RE-4 (reference numerals 601-604, respectively) in a first group 631 comprised of disks DE-1 through DE-4, and RAID devices RE-5 through RE-7 (reference numerals 605-607, respectively) in a second group 632 comprised of disks DE-5 through DE-8. While this configuration allows an entire enclosure to fail without the possibility of any given RAID going down, it is impractical to realize the benefits of known balanced RAID techniques. Thus, where grouping is employed, it may not be possible to maximize space usage efficiency when enclosures do not have equally configured disk sets.

Figure 7:
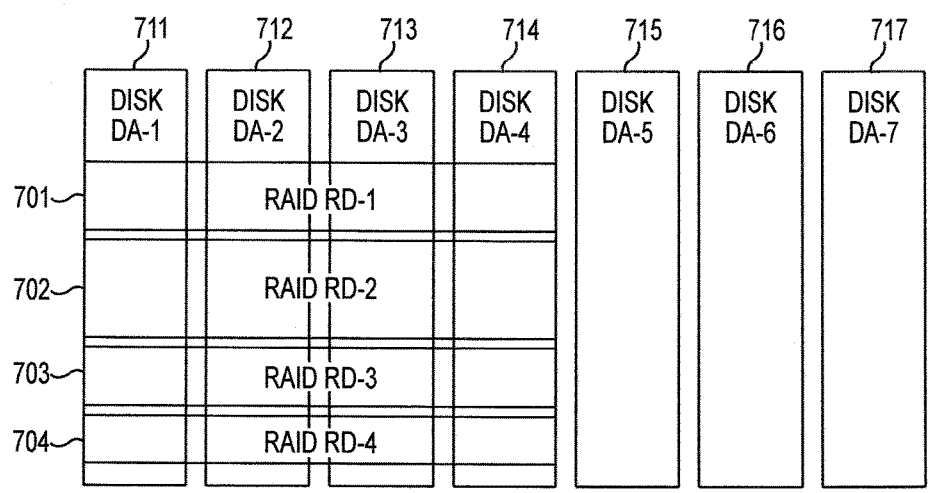
FIGS. 7 and 8 illustrate further example unbalanced RAID configurations.
Figure 8:
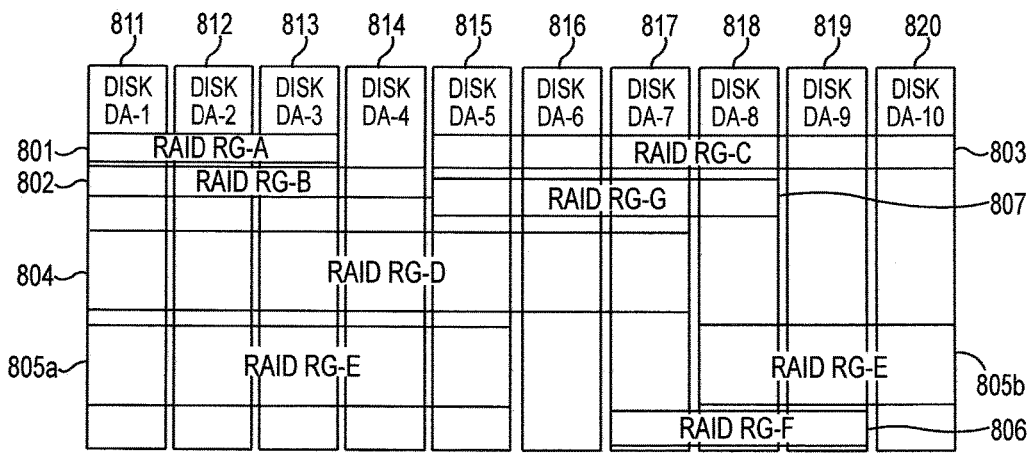

In yet a further example, existing data allocation methods may not be optimal in situations where more or less data storage capacity is desired, or where it is desired to create a higher quality RAID device, by the addition or removal of disks. For example, it may be desirable for the data storage system to remove low quality or unused RAID space from the system when it is possible to create higher quality RAID. Alternatively, disks may be added when additional storage is needed. In these instances, the disks must be "re-striped" to maintain a traditionally balanced RAID configuration. It will be appreciated that re-striping procedures may use significant system resources to move the data to the best possible configuration. Additionally, it may take a long time to complete the re-striping procedures for large configurations. Re-striping may further require the movement to temporary space when disks are completely full, and thus a data page may be moved twice before it finds a permanent home. Thus, in some situations, due to these restraints, the storage system may not be appropriately re-striped after the addition or removal of one or more disks. FIG. 7 provides an example configuration where three disks have been added without re-striping. RAID devices RD-1, RD-2, RD-3, and RD-4 (reference numerals 701-704, respectively) are striped across only the first four physical disks DA-1, DA-2, DA-3, and DA-4 (reference numerals 711-714, respectively). Disks DA-5, DA-6, and DA-7 (reference numerals 715-717, respectively) are not allocated. Furthermore, where there are numerous sequential additions and removal of disks, where the system is not re-striped, a highly disorganized configuration may result that is particularly poorly suited for conventional data allocation methods. With reference to FIG. 8, disks DA-1 through DA-10 are provided (reference numerals 811-820, respectively) with RAID devices RG-A through RG-G (reference numerals 801-807, respectively) striped across various of the disks. On such a data storage device, known data allocation methods may result in a highly inefficient allocation of data thereto.

Overview of Unbalanced RAID Management

In some embodiments, URM may manage free page (data) allocation ordering to balance usage of the disks within a data storage device comprising multiple RAID devices, or within a single RAID tier comprising multiple RAID storage devices. URM may implement the balance based at least in part on the space usage of underlying disks. Balancing page allocations may better utilize multiple disk sizes and/or types within a data storage device or a single RAID tier, and may also limit the necessity of re-striping the RAID devices.

In some embodiments, URM may be configured to operate on many types of RAID devices sharing the same set of disks. This configuration may include a normalization of the different types of RAID devices, as it is appreciated that different RAID levels may manage data in different manners. Further, each RAID level may have a different I/O write pattern and read load on the disks. Still further, different page sizes may manage data separately. For example, this may occur where there are multiple pagepools and/or data compression. Thus, URM may employ normalizing methods to simultaneously manage the various types of RAID devices, free lists, page sizes, etc.

To handle different page sizes, in one embodiment, URM may normalize the usage of disk space by using disk segregation techniques, for example, disk blocks or disk bytes. Such normalization may serve to balance the I/O load across all of the disks. Further, normalization may be employed where a data storage system or RAID tier contains multiple types of disks and where it is desirable that they be used proportionally to their I/O capability. As previously discussed, traditional RAID configurations do not allow for allocations across multiple disk types, so the systems and methods of the present disclosure may employ balancing to allocate storage space across multiple disk types. For example, where both FATA and SATA disks are combined in a RAID tier, URM may determine which RAID device to make the next page allocation within a page pool class, based on balancing that will be described in greater detail below.

Furthermore, in some embodiments, multiple page pool classes may exist within a single data storage system or single RAID tier, where the class and its associated free list may manage a single type of space defined by RAID level, page size, etc. Each class may manage its free lists independently. In this configuration, URM may order RAID space to achieve a desired balance, and then allow each class to order allocations from its own RAID space.

As opposed to wide-striping, where RAID devices are simply striped across all available disks, URM in accordance with the present disclosure, in one embodiment, may divide the balancing methods into two or more individual procedures. The procedures may include one or more of, but are not limited to: 1) raid device overlap procedures, where the RAID devices and the disk manager of the data storage system may communicate with one another to determine available free space. The overlap may be used to determine the amount of space allocation from a set of disks and communicate it between the RAID devices. 2) balancing algorithm procedures, where an algorithm may be employed to determine a score to balance page allocations for a given set of RAID devices. Calculations to determine the least used RAID device may be made. 3) free list balancing, where the system may determine to which RAID device the next page allocation is made. The determination may be made in part based on the scoring information from the balancing algorithm. By periodically or continually monitoring page allocation and return requests when devices have moved out of balance, the RAID devices may be ordered for future allocations. 4) disk addition, where, as previously discussed, new physical disks may be added to a data storage system or an individual RAID tier without the need to re-stripe the RAID devices. 5) device pruning, where, when excess space exists, URM may decide to remove one or more RAID devices. In some embodiments, removing space from heavily used disks may be preferred to maintain a balance across the disks. 6) user initiated configuration, where the user may be given information to control various aspects of the URM; for example, the user may be able to monitor the disk loading, and also enable or disable any of the capabilities discussed above. These and other procedures that comprise URM are discussed in greater detail in the sections that follow.

Balancing Algorithm Procedures

In some embodiments, a balancing algorithm in accordance with the presently disclosed URM system may determine a usage factor for each RAID device by using the current page allocation for each RAID and totaling it across the underlying disks. It may thereby balance the amount of space allocated from each disk. In order to determine current allocations, the URM system in accordance with the present disclosure may function to send page allocation information down to the underlying disks through the RAID device. (This may be desirable because the pages within a virtualization environment may not be aware of the specific disk on which they reside). After all RAID devices have sent page allocation information to the underlying disks, URM may total the usage of each disk to generate a usage factor. The usage factor may then be used to sort the RAID devices on the page pool class free list.

In one embodiment, the URM system may substantially continually or periodically balance the free list when changes in allocations are made. Thus, balancing may occur frequently and may only require minimal CPU, memory, and Disk I/O impact. In this manner, the system may substantially continuously or periodically be allocating and returning pages to/from the free list.

Balancing may occur locally with respect to an individual RAID tier, or it may occur globally, where inputs may be gathered from multiple page pools, and outputs may be directed toward multiple page pools. Outputs may then be used locally within the respective page pool class to order free list allocations.

Figure 9:
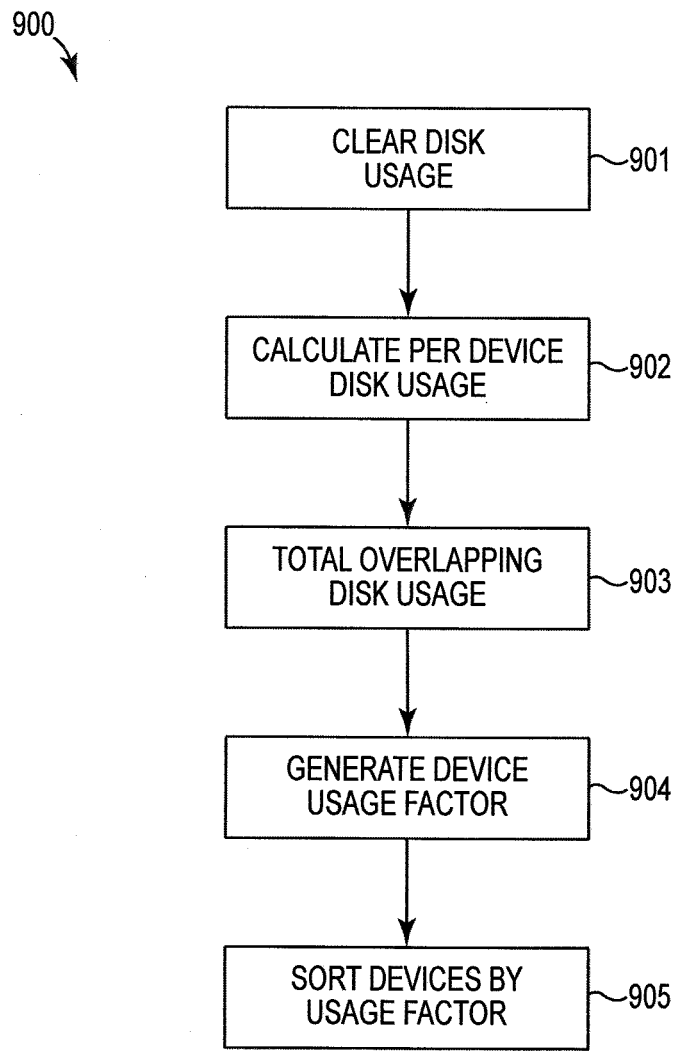
FIG. 9 illustrates an example balancing algorithm in accordance with one embodiment of the present disclosure.

With reference to FIG. 9, a balancing algorithm 900 in accordance with one embodiment of the present disclosure may include one or more operations, including, but not limited to a clear disk usage procedure (block 901), a calculate per device disk usage procedure (block 902), a total overlapping disk usage procedure (block 903), a generate device usage factor procedure (block 904) and a sort devices by usage factor procedure (block 905). Each procedure is discussed in greater detail below.

With additional reference now to FIGS. 10a and 10b, the balancing algorithm 900 will now be discussed, with an example implementation thereof shown in FIG. 10a based on the device shown in FIG. 10b. With regard to procedure 901, the algorithm may be configured to clear the usage information for each disk in the system. This procedure may be performed in order to clear any remaining information left over from previous calculations.

With regard to procedure 902, the algorithm may be configured to calculate the per device disk usage. Per device disk usage may be calculated by dividing the usage of a particular disk (e.g., the number of pages allocated thereto) by the number of disks over which such RAID device is striped, also referred to as extents. As shown in FIG. 10b, for example, the usage of RAID device RG-A is 40, and the usage of RAID device RG-B is 42. Other usages are similarly shown. RAID device RG-A is striped across three disks, DA-1 through DA-3, whereas RG-B is striped across four disks, DA-1 through DA-4. As such, the per device disk usage of RG-A is 40 divided by 3, and the per device disk usage of RG-B is 42 divided by 4. The per RAID device disk usage has been rounded for ease of reference. FIG. 10a shows this calculation for all RAID devices RG-A through RG-B; for RG-A, the result is 13, for FG-B, the result is 10, and so forth.

With regard to procedure 903, the algorithm may be configured to calculate an overlapping disk usage. Overlapping disk usage is the sum of the per device disk usage of the individual RAID devices that are striped across a given disk. For example, as shown in FIG. 10b, RAID devices RG-A, RG-B, RG-D, and RG-E are striped across disk DA-1. As further shown, only RAID devices RG-C and RG-E are striped across disk DA-10. Summing the per device disk usage with respect to each such RAID device, disk DA-1 includes 13 from RG-A, 10 from RG-B, 11 from RG-D, and 12 from RG-E, for a total of 46, as shown in FIG. 10a (Step 2, first table). Similarly, for disk DA-10, the sum is merely the per device usage of RG-C and RG-E, or 23, as shown in FIG. 10a. Calculations for overlapping disk usage of other disks may similarly be made, as shown in FIG. 10a. The overlapping disk usage for a given disk then is applied to or pushed down to each RAID extent of the given disk. For example, the overlapping disk usage with respect to disk DA-1 is applied to or pushed down to the extents of RAID devices RG-A, RG-B, RG-D, and RG-E on disk DA-1. Similarly, the overlapping disk usage with respect to disk DA-10 is applied to or pushed down to the extents of RAID devices RG-C and RG-E on disk DA-10. All such results are shown in the second table of Step 2 in FIG. 10a.

With regard to procedure 904, in one embodiment, the algorithm may be configured to generate a usage factor for each RAID device. The usage factor is the sum of the overlapping disk usages of the extents of a given RAID device, divided by the number of disks over which such device is striped. As shown in FIG. 10b, for example, RAID device RG-A is striped over disks DA-1 through DA-3. Similarly, RAID device RG-B is striped over disks DA-1 through DA-4. To perform this calculation, a sum is made of the overlapping disk usages for each RAID device, as shown in FIG. 10a (Step 2, table 2). This summation, for each RAID device, is presented at block 904. For RAID device RG-A, for example, 46 plus 46 plus 46 (the overlapping disk usages of RG-A for disks DA-1 through DA-3, respectively) is 138. For RAID device RG-B, 46 plus 46 plus 46 plus 33 (the overlapping disk usages of RG-B for disks DA-1 through DA-4, respectively) is 171. Dividing through by the number of disks, 3 and 4, respectively, the usage factor for RAID device RG-A is 46, and the usage factor for RAID device RG-B is 42. Results have been rounded for ease of illustration. Similar calculations may be performed for each RAID device, as shown at block 904. In some embodiments, the number of disks (the divisor in the above equation) may be multiplied by a disk value prior to division. The disk value may represent a subjective evaluation of the value of a particular disk, based on its type, size, configuration, etc. In these embodiments, the usage factor may be the summation of overlapping disk usages divided by the product of the extent count for the RAID device and the disk value.

With regard to procedure 905, in some embodiments, the algorithm may be configured to sort the RAID devices according to the previous calculations, for example, by lowest usage factor. They may be sorted independently for each page pool class, as each class may be configured to manage its own free list and allocate pages. Where compression is applied, a single page pool class may have multiple page sizes, and each one of those lists may be sorted independently.

The algorithm 900 in accordance with the present disclosure may use only minimal memory, CPU load, and disk I/O. As described, it may require only a few values for computation. For CPU load, it may use simple multiplication, division and addition to determine the balance. For disk I/O, it may access limited amount of memory resident information. Thus, the algorithm can be performed as often as desired or necessary to implement the URM methods described herein without significant computing overhead required.

Free List Balancing Procedures

In some embodiments, free list balancing procedures may be included as part of URM to determine an order of free list allocations. Free list balancing may be based on the usage factor input (as calculated using the algorithm above) to determine the order of free list allocations. The free list may allocate pages from the RAID devices with the lowest usage factor, although other allocations are possible. When determining the usage factor, the system may examine all types of RAID devices, including those with different RAID levels and page sizes.

Figure 11:
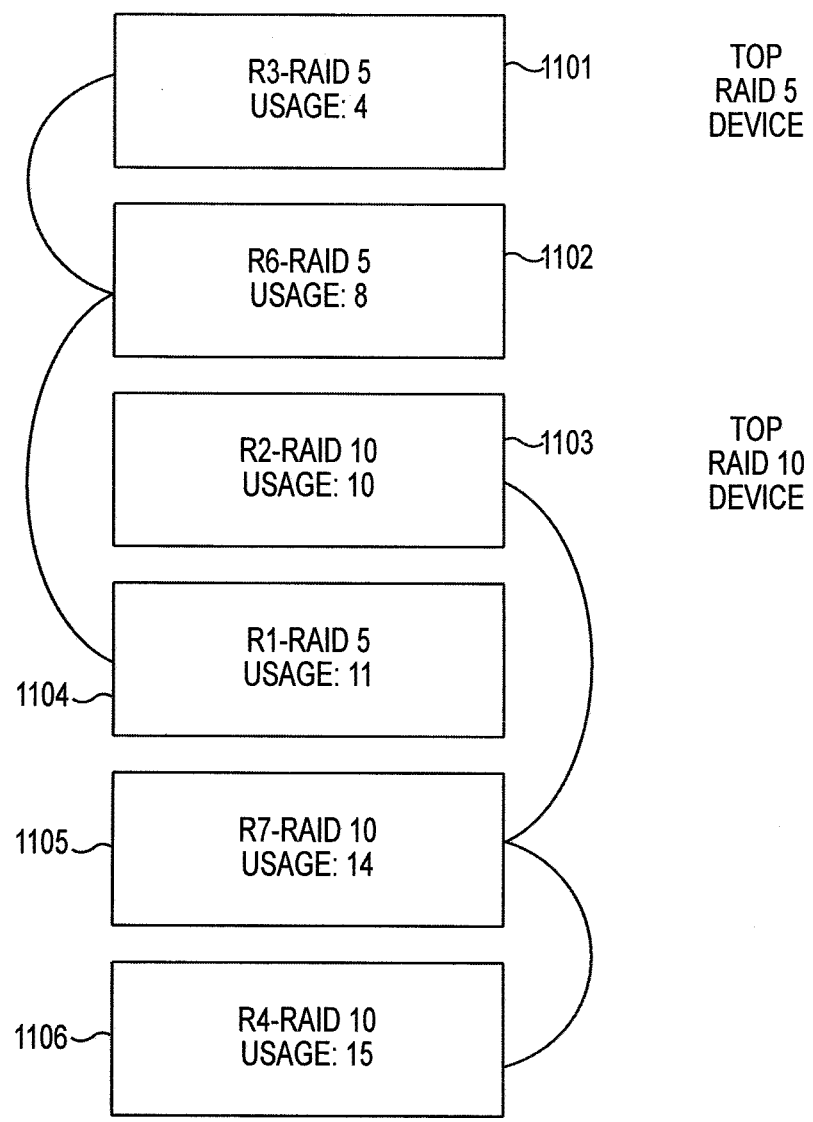
FIG. 11 illustrates an example free list ordering in accordance with one embodiment of the present disclosure.

FIG. 11 depicts an example free list ordering for future allocations, including three RAID 5 devices (reference numerals 1101, 1102, and 1104) and three RAID 10 devices (reference numerals 1103, 1105, and 1106). As shown, the allocations for RAID 5 will first be directed to the top RAID 5 device, 1101, based on the usage factors as shown (in this example, allocations are first directed to the device with the lowest usage factor, as described above). Also, as shown, the allocations for RAID 10 space may first be directed to the top RAID 10 device, 1103, based on, for example, the usage factors. As shown, using URM, ordering does not necessarily correspond with RAID type, thus making allocation more flexible to achieve a better balanced system.

In some embodiments, the free list for each RAID device may generate auto evaluation boundaries. The auto evaluation boundaries may provide a hysteresis mechanism for the free list balance evaluation and possible reordering. If the number of pages allocated to a given RAID device goes above a pre-defined upper boundary or goes below a pre-defined lower boundary, automatic evaluation of the balancing may occur. The boundaries may be determined by using the current allocated page count at the time of balancing and adding or subtracting a boundary difference value. All RAID devices may use the same boundary difference value, or they may use different values. The boundary difference value may be computed by taking the page pool total page count and dividing it by a user configurable value. Such value may be, for example, 10,000, or any other value as desired by the user. The auto evaluation may occur when a boundary is crossed, which may result in a reordering of the free list to achieve a better balance.

Figure 12:
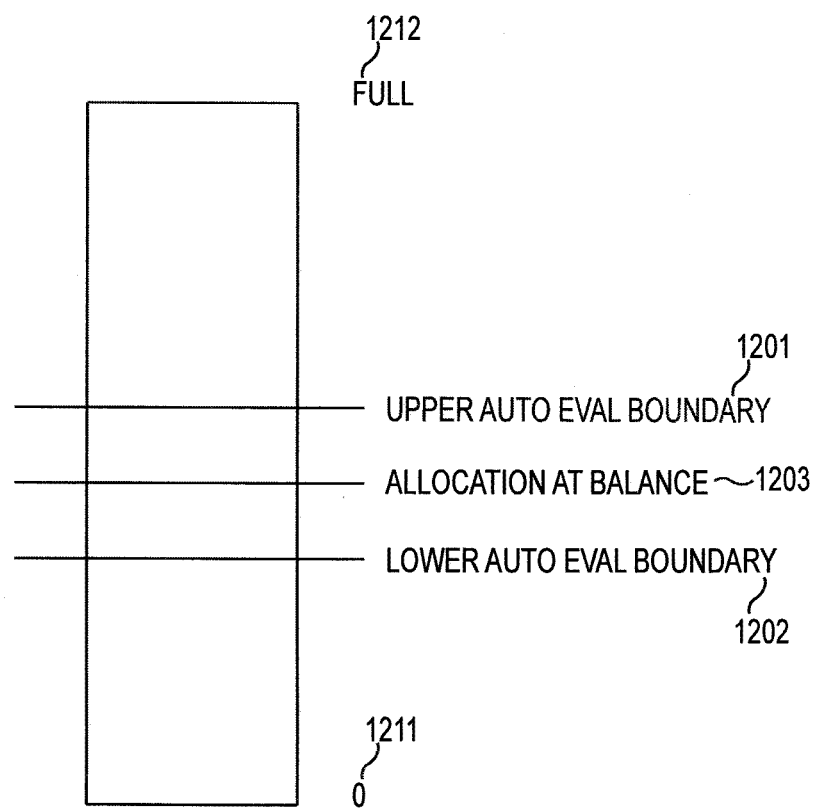
FIG. 12 illustrates an example auto evaluation boundary configuration in accordance with one embodiment of the present disclosure.

As such, the boundary may be provided as a "trigger" to perform the balance evaluation as described above. As shown in FIG. 12, an example representation of boundaries is shown with an upper evaluation boundary 1201, a lower evaluation boundary 1202, and an allocation at balance 1203, in relation to the space available in the device (where "0" represents an empty device (reference numeral 1211) and "full" represents a fully used device (reference numeral 1212)). Page allocation may thus continue until the RAID device runs out of pages or a different device higher in the free list has available pages. In one embodiment, while the balancing algorithm 900 runs, allocations may continue to occur using the previously available usage factor.

Adding/Removing Disk Space Procedures

In some embodiments, URM in accordance with the present disclosure may be configured to allow for additional physical disks to be added to the storage system (or alternatively removed), even where relative disk allocation differs greatly by disk. A RAID device may be allocated on a new set of disks when they are added to the system. For example, as shown in FIG. 7, disks DA-5 through DA-7 were added to a system that already had RAID device striped across disks DA-1 through DA-5. One or more RAID devices can be created on these new disks DA-5 through DA-7, and thereafter the URM may balance the page allocations on the disks without the need to re-stripe the RAID devices.

In the opposite case, where disks are removed from the storage system, disk space allocations may become unbalanced as part of RAID device removal. One set of disks may have been heavily allocated and another set lightly allocated. In this case, allocations may be made to the lightly allocated disks to allow URM to balance the page allocations. When evaluating the disk configuration, the page pool may need to check the balance of disk space allocations, using the algorithms described above. If an imbalance exists, the pagepool may perform an add space procedure for the disk class. The add space procedure may result in a RAID device that uses the lesser used disks, or one that uses the lesser and heavily used disks. An imbalance of disk space allocation may result in multiple RAID devices being created. The pagepool, therefore, may request additional space until the disks are substantially nearly balanced. In one embodiment, the pagepool global configuration may include a parameter to control the add space procedures. This parameter may be defined as the ratio of heavily allocated to lightly allocated. If the ratio is above the imbalance control, then an add space procedure may occur. If it remains below the value, then no add space may occur.

Device "Pruning" Procedures

In some embodiments, URM in accordance with the present disclosure may include device "pruning" procedures, wherein RAID devices may be removed in order of relative score, as determined using the algorithms disclosed above. Pruning may also consider the allocated space on the RAID device in order to move the least number of pages. Further, pruning may also consider disk usage when determining which RAID device to remove. It will be appreciated that reducing allocations from heavily used disks may improve the balance and performance of the disks within a given RAID tier. Pruning procedures may be configured to remove RAID devices in the following order, which may be optimized to move pages the minimum number of times: 1) Remove low scoring space, which may include RAID devices that do not meet desired RAID parameters or that do not use a desired number of disks. 2) Remove low scoring excess space. 3) Remove excess space that is not low scoring. 4) Remove excess space on heavily used disks. 5) Remove temporary space. 6) Remove devices that require the use of temporary space.

For each type of device removal described above, the page pool may factor in the device size and/or the free page percentage to select a RAID device for removal out of possibly many. The disk usage factor, as described above, may be added to this determination to allow the system to move away from heavily used disks, as eliminating RAID devices with a high disk usage factor may improve the performance of the system.

In some embodiments, device pruning procedures may use quality scoring to determine which RAID devices are configured as desired by the user. Quality scoring may compare the current configuration of a RAID device against the hypothetical "best" possible configuration of a RAID. For example, if more disks are available, the RAID device quality score may be relatively lower because more space could be allocated from those disks. In some embodiments, quality scoring may evaluate the following parameters to determine a quality score: RAID type, stripe size, repeat factor, disk type used, and disk folder, among others. Using URM, a RAID that is not configured properly may have a low quality score and may be removed by the system.

Advantages of the Unbalanced RAID Management Procedures Described Herein

Unbalanced RAID Management in accordance with the present disclosure may be required to handle a combination of different disk types within a data storage system or within a single RAID tier and for additional disk organization boundaries, as described above. This is because traditional "wide-striping" methods cannot be employed in such configurations, or because the RAID devices would need to be re-striped requiring significant computing overhead. URM therefore may be employed to balance allocations when traditional RAID architectures cannot create a device that uses multiple disk types.

URM in accordance with the present disclosure can be employed on any data storage system employing RAID devices and on any RAID tier. With respect to different RAID tiers, in some embodiments, it may be preferable to employ URM on tiers other than the highest tier, as the page allocations for the highest tier disks require performance that may best be realized by traditional wide-striping methods. As such, it may be advantageous, in some embodiments, for URM to operate differently depending on the tier. For the highest tier, for example, the user may want to take advantage of wide-striping (which in some instances may require the RAID devices to be re-striped). For the lowest tier, for example, the user may want to minimize the re-striping, since for the lowest tier, the performance may not be as important, and some potential page allocation imbalances may be tolerable. It will be appreciated that, in some configurations, the lowest tier may have the most space and take the longest time to re-stripe. As such, avoiding a re-stripe on this space using the presently described URM methods may save system resources. On any tier wherein URM is employed, implementation may not require significant resources to balance page allocations, because the additional data required may not create a large configuration and the balancing algorithm may not require significant memory and processing resources to perform its functions.

In some embodiments, a data storage system employing URM procedures in accordance with the present disclosure may be a part of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Although the present disclosure has been described with reference to various embodiments, persons having ordinary skill in the art will recognize that changes or modifications may be made in form and detail without departing from the spirit and scope of the disclosure.

What is claimed is:

1. An information handling system comprising:
    a plurality of RAID devices defined on a plurality of physical data storage devices, the plurality of RAID devices being defined in an unbalanced configuration, wherein at least a portion of the RAID devices are not wide-striped across all the physical data storage devices; and
    a processing unit, wherein the processing unit is configured to dynamically allocate data to the plurality of RAID devices so as to balance data allocation on the plurality of RAID devices, wherein balancing data comprises:
        determining a usage factor for each RAID device, wherein the usage factor is based at least in part on usage of the RAID device, which comprises dividing a usage of the RAID device by a number of disks over which the RAID device is striped;
        sorting the plurality of RAID devices based at least in part on the determined usage factors; and
        selecting a RAID device for removal based at least in part on the sorting of the plurality of RAID devices.

2. The information handling system of claim 1, wherein the usage factors are used to sort the plurality of RAID devices on a page pool class free list.

3. The information handling system of claim 1, wherein the usage factor is further based at least in part on an overlapping disk usage, which comprises a sum of the per RAID device disk usage of each RAID device that is striped across a physical disk.

4. The information handling system of claim 3, wherein the usage factor comprises a sum of the overlapping disk usages of each physical disk that the RAID device is striped across.

5. The information handling system of claim 1, wherein the processing unit is further configured to balance data allocation where a RAID device crosses a data storage boundary.

6. The information handling system of claim 1, wherein the processing unit is further configured to balance data allocation where a physical disk is added to or removed from the information handling system.

7. A method for dynamically balancing the allocation of data among a plurality of physical data storage devices having a plurality of RAID devices defined thereon, the plurality of RAID devices being defined in an unbalanced configuration, wherein at least a portion of the RAID devices are not wide-striped across all the physical data storage devices, the method comprising:
    determining a usage factor unique to each RAID device, wherein the usage factor is based at least in part on usage of the RAID device, which comprises dividing a usage of the RAID device by a number of disks over which the RAID device is striped;
    sorting the plurality of RAID devices based at least in part on the determined usage factors; and
    selecting a RAID device for removal based at least in part on the sorting of the plurality of RAID devices.

8. The method of claim 7, wherein the usage factor is used to sort the plurality of RAID devices on a page pool class free list.

9. The method of claim 7, wherein a RAID device with the lowest usage factor is removed.

10. The method of claim 7, wherein balancing occurs where a RAID device crosses a data storage boundary.

11. A method for allocating space from a RAID device in a storage system comprising a plurality of physical data storage devices having a plurality of RAID devices defined thereon in an unbalanced configuration, wherein at least a portion of the RAID devices are not wide-striped across all the physical data storage devices, the method comprising:
    for each RAID device:
        calculating an amount of space used on each of the plurality of disks by the RAID device;

calculating a total amount of space used by the RAID device by summing the amount of space used by the RAID device on each of the plurality of disks; and calculating a usage factor for the RAID device based on the calculated total amount of space and a relative performance score of each of the plurality of disks;

sorting the plurality of RAID devices based on the calculated usage factors; and selecting a RAID device for removal based at least in part on the sorting of the plurality of RAID devices.

12. The method of claim 11, wherein at least one of the plurality of disks is of a different type than at least one other of the plurality of disks.

13. The method of claim 11, wherein at least one of the plurality of disks is of a different size than at least on other of the plurality of disks.

14. The method of claim 11, further comprising:

adding a disk to the plurality of disks;

defining a new RAID device that comprises the added disk;

sorting the plurality RAID devices and the new RAID device based on a usage factor unique to each such RAID device; and allocating data from the RAID device selected for removal based on the sort.

15. The method of claim 14, wherein the new RAID device comprises both the added disk and at least one of the plurality of disks.

16. The method of claim 14, wherein the new RAID device is grouped into a separate group from the plurality of RAID devices.

17. The information handling system of claim 1, wherein selecting a RAID device for removal is further based at least in part on size of each RAID device of the plurality of RAID devices.

18. The information handling system of claim 1, wherein selecting a RAID device for removal is further based at least in part on free page percentage of each RAID device of the plurality of RAID devices.

19. The information handling system of claim 1, wherein the processing unit is further configured to allocate data from the RAID device selected for removal to at least some of the remaining plurality of RAID devices based on the sort.

20. The method of claim 11, further comprising allocating data from the RAID device selected for removal to at least some of the remaining plurality of RAID devices based on the sort.

* * * * *